United States Patent
Krivko

(10) Patent No.: US 10,920,589 B2
(45) Date of Patent: Feb. 16, 2021

(54) SIX-STROKE ROTARY-VANE INTERNAL COMBUSTION ENGINE

(71) Applicant: Nickolay Mikhailovich Krivko, Leningradskaya oblast (RU)

(72) Inventor: Nickolay Mikhailovich Krivko, Leningradskaya oblast (RU)

( * ) Notice: Subject to any disclaimer, the term of this patent is extended or adjusted under 35 U.S.C. 154(b) by 158 days.

(21) Appl. No.: 16/096,436

(22) PCT Filed: May 17, 2017

(86) PCT No.: PCT/RU2017/000316
§ 371 (c)(1),
(2) Date: Oct. 25, 2018

(87) PCT Pub. No.: WO2017/204683
PCT Pub. Date: Nov. 30, 2017

(65) Prior Publication Data
US 2019/0145261 A1    May 16, 2019

(30) Foreign Application Priority Data
May 25, 2016  (RU) ................................ 2016120215

(51) Int. Cl.
*F01C 1/344* (2006.01)
*F01C 20/06* (2006.01)
(Continued)

(52) U.S. Cl.
CPC ............ *F01C 1/3446* (2013.01); *F01C 1/344* (2013.01); *F01C 20/06* (2013.01); *F02B 53/02* (2013.01);
(Continued)

(58) Field of Classification Search
CPC .......... F02B 53/02; F02B 55/02; F02B 55/08; F02B 55/14; F02B 25/021; F01C 1/344; F01C 1/3446; F01C 21/0809; Y02T 10/17
See application file for complete search history.

(56) References Cited

U.S. PATENT DOCUMENTS 3,908,608 A * 9/1975 Fox .......................... F02B 53/08
                                                          123/213
4,091,770 A * 5/1978 Suzuki ...................... F01C 1/22
                                                          123/242
(Continued)

FOREIGN PATENT DOCUMENTS

EP    1022446 A1 * 7/2000 .............. F02B 41/04
FR    2381176 A1    9/1978
(Continued)

OTHER PUBLICATIONS

International Search Report dated Aug. 14, 2017 from corresponding International (PCT) Patent Application No. PCT/RU2017/000316, 4 pages.
(Continued)

*Primary Examiner* — Audrey K Bradley
(74) *Attorney, Agent, or Firm* — Ohlandt, Greeley, Ruggiero & Perle, L.L.P.

(57) ABSTRACT

A six-stroke rotary-vane internal combustion engine includes a stator having working chambers for intake and compression of air-fuel mixture alternating with working chambers for expansion and removing of combustion products, and a cylindrical rotor including longitudinal grooves housing blades. Side walls of all the working chambers are formed by rotating parts of the rotor, the combustion chambers are formed as hemispherical recesses on a cylindrical surface of the rotor, the working chambers of the stator are formed as cylindrical borings with axes parallel to the stator axis and evenly spaced along an inner surface of the stator, (Continued)

each blade consists of separate plates freely displaceable relative to each other, each plate of the blade being made of two parts movable apart in axial direction by a spring, the number of blades is a multiple of the number of the chambers for intake of air-fuel mixture.

2 Claims, 4 Drawing Sheets

(51) Int. Cl.
*F01C 21/08* (2006.01)
*F02B 53/02* (2006.01)
*F02B 55/02* (2006.01)
*F02B 55/08* (2006.01)
*F02B 55/14* (2006.01)
*F02B 75/02* (2006.01)

(52) U.S. Cl.
CPC .............. *F02B 55/02* (2013.01); *F02B 55/08* (2013.01); *F02B 55/14* (2013.01); *F01C 21/0809* (2013.01); *F02B 75/021* (2013.01)

(56) References Cited

U.S. PATENT DOCUMENTS

| | | | |
|---|---|---|---|
| 5,711,268 A * | 1/1998 | Holdampf | F01C 1/3446 |
| | | | 123/243 |
| 6,125,814 A | 10/2000 | Tang | |
| 6,237,560 B1 * | 5/2001 | Saito | F01C 1/3446 |
| | | | 123/243 |
| 6,536,403 B1 * | 3/2003 | Elsherbini | F01C 1/3441 |
| | | | 123/243 |

FOREIGN PATENT DOCUMENTS

| | | |
|---|---|---|
| RU | 2387850 A | 8/2009 |
| RU | 2386823 C1 | 4/2010 |
| RU | 2426899 A | 5/2010 |
| RU | 2416032 A | 11/2010 |
| WO | WO 00/03132 A1 | 1/2000 |

OTHER PUBLICATIONS

Written Opinion dated Aug. 14, 2017 from corresponding International (PCT) Patent Application No. PCT/RU2017/000316, 3 pages.
Article from the Great Soviet Encyclopedia (GSE, "Soviet Encyclopedia"), 1971, vol. 4, pp. 289-290, mentioned in the application PCT/RU2017/000316.

* cited by examiner

SIX-STROKE ROTARY-VANE INTERNAL COMBUSTION ENGINE

This invention refers to the engine-building area, in particular, to internal combustion engines with rotating parts, more specifically to a rotary-vane internal combustion engine (ICE), which can be used on water, air and land transport vehicles.

The Wankel rotary ICE is well known, it has a triangular rotor (piston) with arc-shaped side face, rotating on the eccentric shaft (stator) acting as a cylinder with working face made as epitrochoid. The rotor-to-stator kinematical connection is provided by means of gear wheel. The end and radial seals are arranged in the form of spring-loaded plates located in the appropriate grooves on the rotor end surfaces and on the corners of its triangle (GSE, Soviet encyclopedia, 1971, volume 4, pages 289-290) (1). 3 full motion cycles occur per one rotor revolution, the eccentric shaft makes 3 revolutions.

The Wankel engine is notable for its simple design and has proven its efficiency in practical application. In particular, it has been successfully applied by Mazda in the form of Renesis engine for RX-8 sports car. However, the Wankel engine has a number of significant disadvantages, the main ones of which include low adaptability to streamlined manufacture, unrepairability, unreliable end surface and radial seals and incomplete fuel combustion due to the non-optimal shape of its combustion chamber.

There is a rotary ICE under the RF patent for invention #2416032 (published on 10 Nov. 2010) (2). This engine has a housing (stator) with elliptic working face, a cylindrical rotor with blades fitted in its longitudinal grooves, the pulleys fitted on these blades displace them in radial direction, the pulleys roll over within the shaped grooves made in the side walls of the stator. The end surface and radial seals are flat-topped plates fitted in the blade grooves and spring-loaded rings located in the side wall bores. The four-stroke cycle occurs in each working chamber of the engine (2) per one full revolution of the rotor with shaft, which means that the number of working strokes per one revolution of the shaft and is determined by the number of working chambers that may vary from six to twenty-four.

This engine according to the patent (2) repeats the Wankel engine's major drawbacks, in particular, low adaptability to manufacture, low reliability of seals and non-optimal shape of its combustion chamber. In addition, this engine is quite large in size.

There is also a rotary ICE described in the RF patent for invention No 2386823 (published on 20 Apr. 2010) (3). This engine has a housing featuring inlet and outlet ports and oval internal working face, a rotor with retractable working blades, an interconnected compressed air source, a fuel injector and a turbo-supercharger. The working vanes of this engine form four sections in the housing. This ICE is also equipped with an electro-pneumatic system for extension and lockup of the blades in the rotor grooves, this system comprises an electro-pneumatic slide, a compressed air source linked to the under-blade chambers of the rotor. The side surfaces of the rotor grooves have recesses, where the spring-loaded blocks are fitted, forming the chambers, which are, in their turn, are interconnected with the slide by means of air ducts. The blades are made as a set of plates moving relative to each other and there is an additional port with detachable cover made between the inlet and outlet ports in the engine housing.

The disadvantages of the engine described in (3) are as follows: Too much design complexity, in particular, due to complex slide assembly and spring-loaded blocks, quite non-optimal shape of combustion chamber and absence of end surface seal between the rotor and the side walls.

The engine described in the RF patent for invention #2387850 (published on 27 Apr. 2010) (4) selected as a prototype is the closest to the proposed invention. The engine described in (4) has a fixed housing with grooves, a rotor rigidly fitted on the shaft as a spoke wheel featuring guide-channels for n-pairs of blades with different functions. There are recesses made on the rim surface of the rotor forming the combustion chambers isolated from the blades. The rotor rim grooves form the functional cavities with inlet and outlet ports. The shape of the grooves in longitudinal section is the n-alternating displaced full-period sinusoids with flat tops directed inward. The rotor shape is made of two separate parts a shaft and a hollow shaft secured rigidly to the end surfaces in the lower and upper sections of the rotor and not passing through its body. Inside the rotor along its geometrical axis there is a free-rotating shaft of the retractable mechanism with rotating bushing. This retractable mechanism is either a crank-type rack and pinion or four-pivoted lever-type crank mechanisms with gear-cam bushing. The shaft and bushing of the retractable mechanism is provided with pushers to extract the blades on the shaft splines of the retractable mechanism and bushing, there are double-sided gear clutches, each of which separately and alternatively engages with the half-clutches of the gear-cam bushing. The attachment assembly includes a cam mechanism with drive allowing the gear clutches to move axial direction. Finally, there are surface ignition elements located on the rim wall of the engine housing (4) within the passes separating the compression and working cavities.

The engine (4) taken as a prototype features a higher efficiency and increased power-to-weight ratio. In the meantime, the disadvantage of this engine (4) is its design complexity, in particular, the blade extension mechanism and related insufficient reliability and large size and low adaptability to streamlined manufacture. In addition, the prototype and all the considered engines do not make it possible to switch the engine over to economic run, for example, when the cruise speed is reached.

The task of this invention is to create an ICE being simple in design and adaptable to streamlined production with rotary parts and featuring reliability and high performance capabilities, allowing the engine to be switched over to economical run, in particular, upon reaching the cruise speed. The result to be achieved in this invention consists in simplifying the ICE design with rotary parts and in increasing its reliability and adaptability to streamlined manufacture, preventing the unburned fractions of air-fuel mixture from being emitted into atmosphere as well as ensuring that the engine can be switched over to economic run.

The task is to be resolved as follows the rotary-vane ICE featuring the inlet and outlet ports and ignition plug holes with air-fuel intake and compression chambers alternating with the combustion product expansion and removal chambers, the cylindrical rotor attached to the shaft with longitudinal grooves with blades and combustion chambers arranged on the cylindrical surface of the rotor, the side walls, the front and rear end shields, in this case the side walls are arranged in the form of cylindrical borings with the axes being parallel to the stator axis and spaced evenly all over its internal surface, each blade consists of separate plates with possible mutual displacement, in this case each blade plate is made of two parts being pulled apart by a spring in axial direction and the number of blades is equal to the number of air-fuel mixture intake chambers. In order to prevent gas leaks beyond the working zone the stator end surfaces have grooves all over the edge of working face with strip seals fitted, each of these seals is pressed by springs against the internal wall of the groove and against the side wall of the engine bedding this end surface of the stator. When the steady motion mode is reached, for example, when the cruise speed is reached, the fuel supply to one (as minimum) of the air-fuel intake chambers can be stopped provided that supply is maintained to the given air chamber.

It should be noted that according to this invention the working surfaces of the ICE major parts are to be manufactured using elementary motion machines—rotary and straight line onward machines, which provides adaptability to streamlined manufacture of this engine.

Thus, according to this invention the rotary-vane ICE implements the six-stroke cycle consisting of the following strokes: Air-fuel mixture injection, air-fuel mixture compression, compressed air-fuel mixture combustion, expansion of combustion products, discharge of combustion products and dwell, in this case the combustion process is separated from the compression and expansion in time and space. The sixth stroke—a dwell—prevents the air-fuel mixture leaks into the exhaust gas discharge zone and the exhaust gases into the air-fuel mixture intake zone. The number of double (triple, quadruple, etc) strokes per one shaft revolution is equal to the number of blades within the rotor grooves. The invention also makes it possible to switch the ICE to economical run, in this case the number of working stokes per one rotor revolution will remain the same.

The essence of this invention is explained by drawings, where

Figure 1:
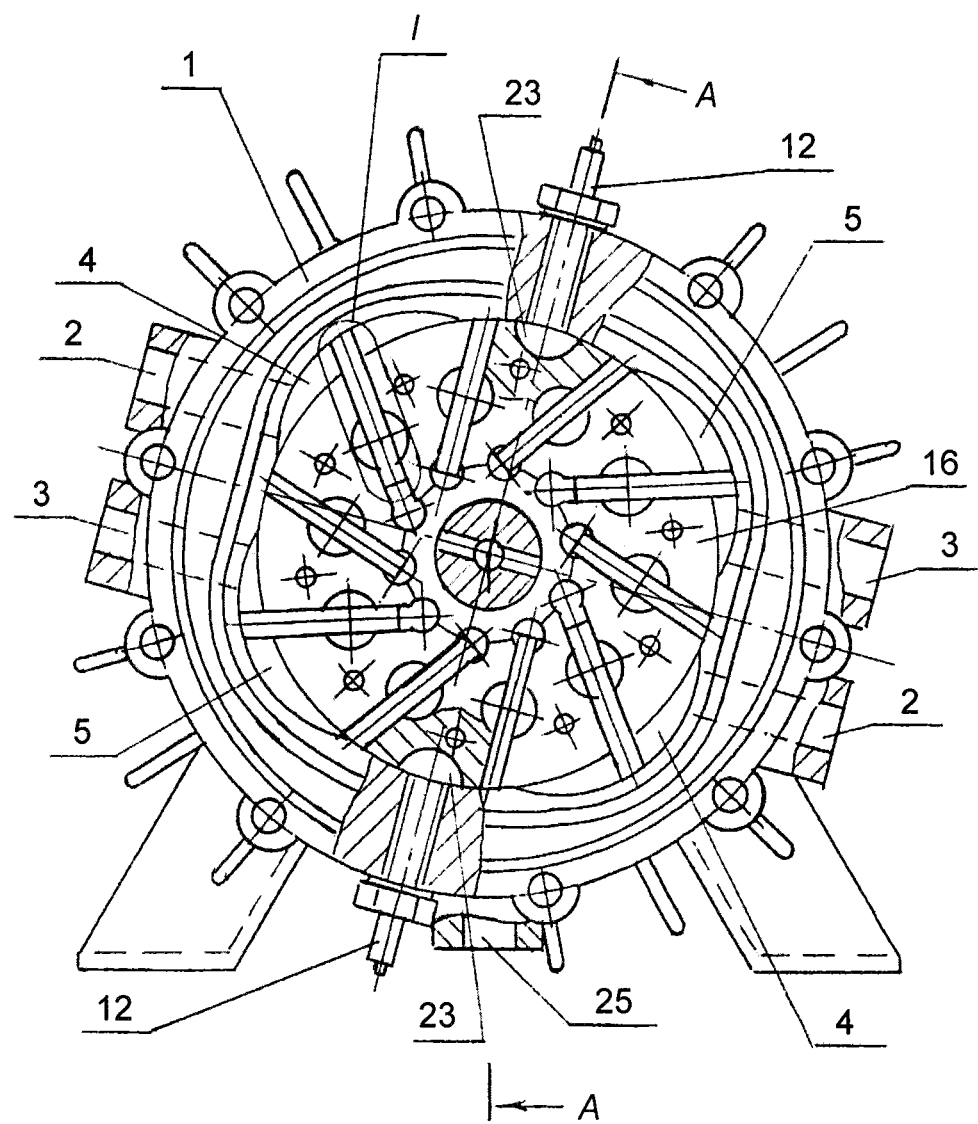
FIG. 1 illustrates the engine in cross-sectional view.
Figure 2:
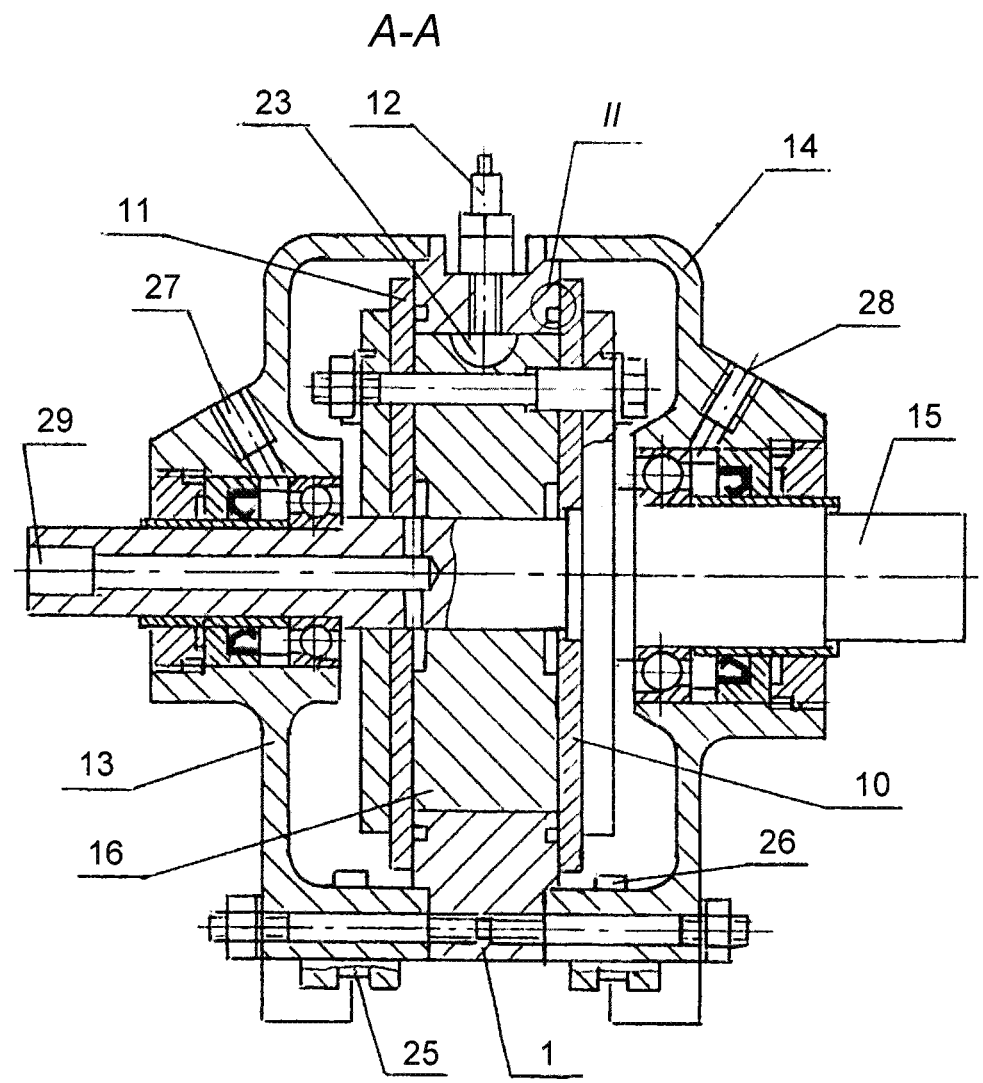
FIG. 2 illustrates cross-section A-A from FIG. 1.
Figure 3:
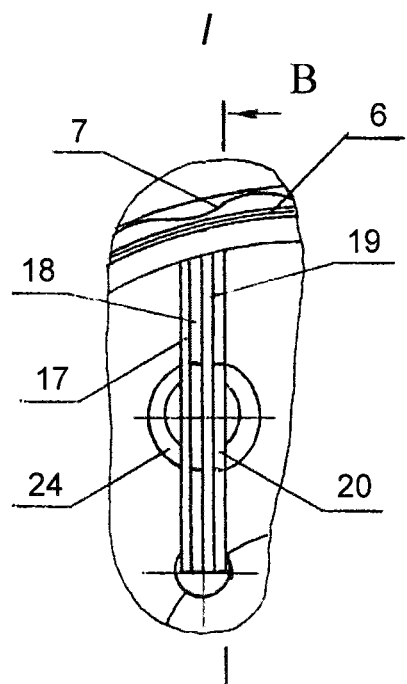
FIG. 3 illustrates point I from FIG. 1 (some parts are not shown for clarity)
Figure 4:
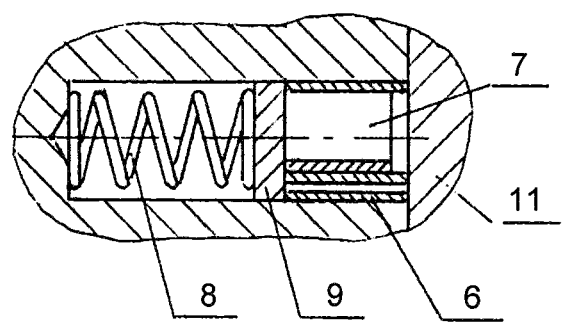
FIG. 4 illustrates point II from FIG. 2.
Figure 5:
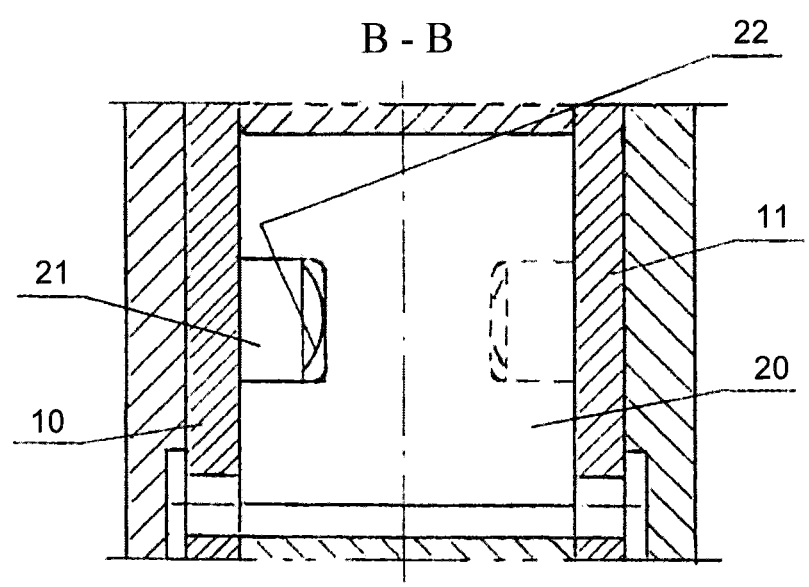
FIG. 5 illustrates cross-section B-B from 3.

The rotary-vane ICE has stator 1 (FIGS. 1; 2) with inlet 2 and outlet 3 ports (FIG. 1). Along the cylindrical surface of stator 1 there are cylindrical bores forming air-fuel intake mixture chamber 4 and combustion product expansion chambers 5 (FIG. 1). Within the edge grooves of stator 1 enveloping the working surfaces of stator 1 there are strip (for example) end seals 6 pressed by springs 7 against the internal wall of the groove and by springs 8 through intermediate parts 9 (FIGS. 2; 3; 4) against side walls 10 and 11 (FIGS. 2; 4; 5). Plugs 12 are screwed into the threaded holes of stator 1 (FIGS. 1; 2). The front 13 and rear 14 end shields are centered and rigidly attached to stator 1 (FIG. 2). Shaft 15 with rigidly fixed cylindrical rotor 16 with side walls 10 and 11 is fitted in the end shields on the radial-thrust bearings (FIGS. 1; 2). There are plates 17, 18, 19, 20 with spacers 21 fitted in the longitudinal grooves of rotor 16 (FIGS. 3; 5). The quantity of plates may be random, but no less than two. Spacers 21 and plates 17, 18, 19, 20 come loose by springs 22 (FIG. 5). Semispherical recesses 23 are made over the cylindrical surface of rotor 16 between the longitudinal grooves (FIGS. 1; 2). Spring-loaded oil removers 24 are fitted in the bores made in stator 1 along the longitudinal grooves (FIGS. 1;2). Holes 25, 26 as well as holes 27 and 28 (in an arbitrary way) are made in the lower side of shields 13 and 14 (FIGS. 1; 2). Shaft 15 has hole 29 extended to the edge (FIG. 2).

Let us review the ICE operation according to the invention by an example given in the drawings (with two intake chambers, clockwise rotation, FIG. 1).

Prior to starting the air is supplied under pressure $P_1$ with periodic oil injection (an "oil-air" system) through holes 27 and 28 in shields 13 and 14, which passing through the radial-thrust bearings lubricates and cools the latter and then gets into the space between the end shields and the rotating parts of rotor 16, where it is to be removed for recycling through holes 25 and 26 in the lower side of the shields. Simultaneously, the air under pressure $P_2$ (an oil-air system) is supplied through hole 29 in shaft 15 to the grooves of rotor 16 to plates 17, 18, 19, 20 located in grooves (hereinafter to be referred as a combination of blades), this air draws apart the blades in radial direction, providing a labyrinth-groove seal within the "blade-stator" pair and lubricating them at the same time. Each blade plate is pressed by spring 22 through spacer 21 against side walls 10 and 11 in a checkerboard manner, thus preventing the inter-chamber leaks of air-fuel mixture and exhaust gases. Strip end surfaces seals 6 prevent the leakage of air-fuel mixture and its combustions beyond the operating zone of the engine. During rotation of rotor 16, the air-fuel mixture is sucked into the space of air-fuel mixture intake chambers 4 through inlet holes 2, this air-fuel mixture then during further rotation is compressed by the next blade within the tapered space limited by the cylindrical surfaces of stator 1, rotor 16 and side walls 10 and 11. At the final stage of compression the mixture is concentrated in semispherical recess 23 on the cylindrical surface of rotor 16. At this moment plugs 12 ignite the mixture, which then burns within the closed spherical space before the front moving blade starts extending into the open space of combustion product expansion chamber 5 thus giving torque to shaft 15. During further rotation outlet ports 3 open up after the upstream blades and exhaust gases are removed from chambers 5. The central cylindrical surface of the stator between combustion product expansion and exhaust gas chambers 5 and air-fuel mixture intake and compression chambers 4 prevents the exhaust gases from entering into the air-fuel mixture intake zone. The synchrony of the combustion process within the symmetrically located chambers makes it possible to relief the bearing supports from radial forces. The synchronous movement of the blades within the rotor grooves provides dynamic balance of the engine. Once the steady motion mode (cruise speed) is reached the air-fuel mixture can be halted by any known method provided that the supply is maintained to the given air chamber. In this case, the engine continues to operate with reduces power output with the same number of working strokes maintained per one rotor revolution.

Thus, the invention makes it possible to implement the six-stroke cycle of rotary-vane ICE featuring significant advantages. Thus, allowing the side walls of all the working chambers rotate jointly with the rotor and blades and fitting seals within the "rotor-blade" and "blade-stator" pairs in a multi-row fashion makes it possible to enhance the engine's operating space tightness and reduce friction losses. A regular oil injection into the air flow allows lubricating the friction surfaces and stator and blade contact pattern as well as lubricating the rotor shaft bearings and cooling down the engine parts. The multiple-point combustion prevent one-sided heating of the engine parts and the synchronous movement of blades in radial direction allows smooth vibration free operation of the engine The engine's operating strokes (in an example considered the dual operating stroke occurs in every 36° of the shaft rotation), thus providing smooth torque. The fuel combustion in constant volume within the spherical chamber makes it possible to utilize the chemical energy of fuel as much as possible. The possibility described by this invention to stop fuel supply to a number of the air-fuel mixture intake chamber with air supply maintained provides the most efficient engine performance. Making the working surfaces flat and cylindrical ensures a high degree of adaptability to streamlined manufacture of the engine.

The invention claimed is:

1. A six-stroke rotary-vane internal combustion engine comprising:
   a stator having inlet ports and outlet ports, holes for spark plugs and working chambers for intake and compression of an air-fuel mixture alternating with working chambers for expansion and removal of combustion products;
   a cylindrical rotor rigidly fixed on a shaft and having side walls, the cylindrical rotor comprising longitudinal grooves housing blades, combustion chambers being formed on a cylindrical surface of the rotor between the grooves;
   front and rear end shields,
   side walls of all the working chambers of the engine are formed by rotating parts of the rotor,
   wherein the combustion chambers are formed as hemispherical recesses on the cylindrical surface of the rotor between the longitudinal grooves of the rotor, and
   the working chambers of the stator are formed as cylindrical borings with axes parallel to a stator axis, the borings being evenly spaced along an inner surface of the stator,
   each blade consists of separate plates freely displaceable relative to each other, each plate of the blade being made of two parts movable apart in an axial direction by a spring,
   wherein the number of blades is a multiple of the number of the chambers for intake of the air-fuel mixture.

2. The engine of claim 1, wherein the engine is configured to change to an economical mode of operation by stopping fuel supply to a part of the chambers for intake and compression of the air-fuel mixture while maintaining air supply to the chambers.

* * * * *